United States Patent [19]

Gleim et al.

[11] Patent Number: 5,280,554
[45] Date of Patent: Jan. 18, 1994

[54] CONNECTING ARRANGEMENT WITH A CONNECTOR AND MATING ELEMENT AND A CABLE WITH ELECTRICAL AND OPTICAL PROPERTIES

[75] Inventors: Günter Gleim; Siegfried Quandt, both of Villingen-Schwenningen, Fed. Rep. of Germany

[73] Assignee: Deutsche Thomson-Brandt GmbH, Hanover, Fed. Rep. of Germany

[21] Appl. No.: 499,264
[22] PCT Filed: Dec. 12, 1988
[86] PCT No.: PCT/EP88/01142
  § 371 Date: Nov. 22, 1991
  § 102(e) Date: Nov. 22, 1991
[87] PCT Pub. No.: WO89/06057
  PCT Pub. Date: Jun. 29, 1989

[30] Foreign Application Priority Data
Dec. 24, 1987 [DE] Fed. Rep. of Germany ....... 3744124

[51] Int. Cl.⁵ .............................................. G02B 6/44
[52] U.S. Cl. ...................................... 385/100; 439/245
[58] Field of Search ....................... 385/100, 101, 125; 439/245, 247, 248, 249

[56] References Cited

U.S. PATENT DOCUMENTS 3,399,012  8/1968  Peters ................................. 385/125
5,146,528  9/1992  Gleim et al. ..................... 385/100 X
5,169,716 12/1992  Croft et al. ...................... 385/100 X Primary Examiner—Akm E. Ullah
Attorney, Agent, or Firm—Max Fogiel

[57] ABSTRACT

A connecting arrangement in which a connector and a mating element are connectable to a cable which has at least one electrically conducting core. This core is surrounded by a light-transmitting electrical insulating layer. The connector and mating element each have at least one electrical contact and one optical contact, through which the connector and the mating element are optically coupled for light transmission at a location where the insulating layer lies against the cable. The connector and mating element conduct both electrical and optical signals.

22 Claims, 2 Drawing Sheets it is accordingly the object of the present invention to

CONNECTING ARRANGEMENT WITH A CONNECTOR AND MATING ELEMENT AND A CABLE WITH ELECTRICAL AND OPTICAL PROPERTIES

BACKGROUND OF THE INVENTION

The invention concerns a connector that an adaptor fits onto and that a cable with at least one core and at least one layer of insulation can be connected to.

Examples of connectors of this type are the plugs and jacks that a cable can be connected to. A plug and a jack can be used to connect two cables together or a cable to a piece of equipment. Communications utilizes both electric and optical cable and a special connector is needed for each type.

SUMMARY OF THE INVENTION

A plugging component that an electric cable with several insulated cores is connected to is known from German OS 3 338 232. In addition to the electric cores, it has an optical signaling conductor that has an optical transmitter at one end and an optical receiver at the other. The transmitter is in one plugging component and the receiver in another. Since these plugs, however, have only electric contacts, it is impossible to transmit optical signals by way of one plugging component inserted into another.

A connector for a light conductor that is also equipped with an electric contact for an electric core is known from European Application 0 164 993. A light conductor and an electric cable must accordingly be attached to this connector in order to transmit both optical and electric signals.

It is accordingly the object of the present invention to improve such a connector so that, when it is attached to a cable with at least one core and one transparent layer of insulation, it will be able to transmit both electric and optical signals.

This object is attained in accordance with the invention in that the connector is transparent for the purpose of optical coupling where the layer of insulation on the cable rests against it.

The invention will now be specified with reference to the figures.

DESCRIPTION OF THE PREFERRED EMBODIMENTS

The video signals in a combination video recorder V and television set F are transmitted over coaxial cable. Control signals must also be transmitted along with the video signals. This can be done optically if the layer of insulation that functions as a dielectric between the inner and outer conductors in the coaxial cable is made of optically conductive material. In other consumer-electronic equipment, information is transmitted over a simple cable, between a compact-disk player and an amplifier for example. In this case as well it is possible to create additional information channels by making the layer of insulation of optically conductive material. Thus, optical signals can be carried in addition to the electronic signal, or to the electricity in the power cord, if the insulation is made of optically conductive material. To connect such cables together or to the equipment, however, special connectors are necessary.

Figure 1:
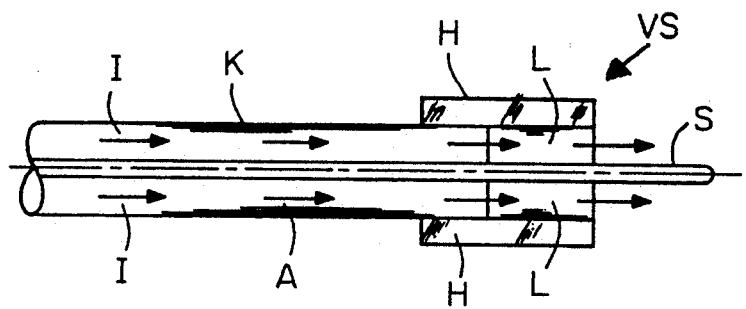
FIG. 1 illustrates one embodiment of a connector in accordance with the invention by way of example and FIG. 2 illustrates an adaptor that fits the embodiment

FIG. 1 illustrates a connector VS in the form of a plug connected to a single-core cable K.

Plug VS is accommodated in a tubular sleeve H that extends over part of cable K. Paralleling the axis of sleeve H is a pin S that is electrically connected to the core A of cable K. Between pin S and sleeve H is a tubular coupling L with a cross-section that preferably matches the cross-section of the layer I of insulation around cable K. Layer I of insulation can rest against optical coupling L but need not do so, because any space between the two components, although it might attenuate the optical connection, could not interrupt it. The light, indicated by the arrows, travels from layer I of insulation into optical coupling L, emerges from its face, and enters for example the optical coupling of a jack VB that plug VS fits into and that is illustrated in longitudinal section in FIG. 2.

Figure 2:
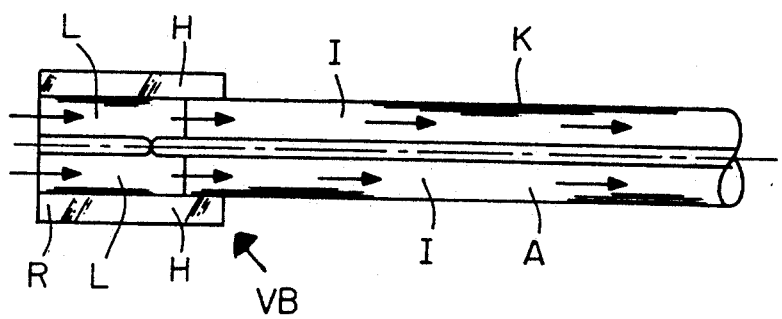

The outside of the jack VB in FIG. 2 terminates in a sleeve H that extends partly over cable K. Extending along the axis of sleeve H is a cylindrical opening R that accommodates the pin S on plug VS and is electrically connected to cable K. Embedded between the cylindrical opening R that accommodates the pin S in plug VS is an also cylindrical optical coupling L. Its cross-section preferably matches that of the layer I of insulation on cable K. As with the plug VS illustrated in FIG. 2, the layer I of insulation on cable K can rest against optical coupling L but need not do so, because any space between the two components could not interrupt the optical connection. The light, indicated by the arrows, leaves the optical coupling L of the plug VS illustrated in FIG. 2 and enters the optical coupling L in jack VB, from the end of which it shines into the layer I of insulation on cable K.

Cable K can be secured in plug VS or jack VB by known, threaded, tension, or soldered connections. The pin S on plug VS is secured in the cylindrical opening R in jack VB by springs or by fitting tight, establish an electric contact between pin S and cylindrical opening R.

When, as illustrated in Figure for example, the light travels from the transparent layer I of insulation into optical coupling L, it is of advantage for the cross-section of coupling L to be larger than that of layer I of insulation to ensure that all the light leaving the insulation will be intercepted by the coupling.

If on the other hand the light travels from optical coupling L into the optically conductive layer I of insulation on cable K, it is of advantage for the cross-section of optical coupling L to be smaller than that of layer I to ensure that all the light leaving the coupling will be intercepted by the insulation.

If light is to be transmitted alternately in each direction, however, it will be more effective for the cross-section of optical coupling L to match that of layer I of insulation.

Figure 3:
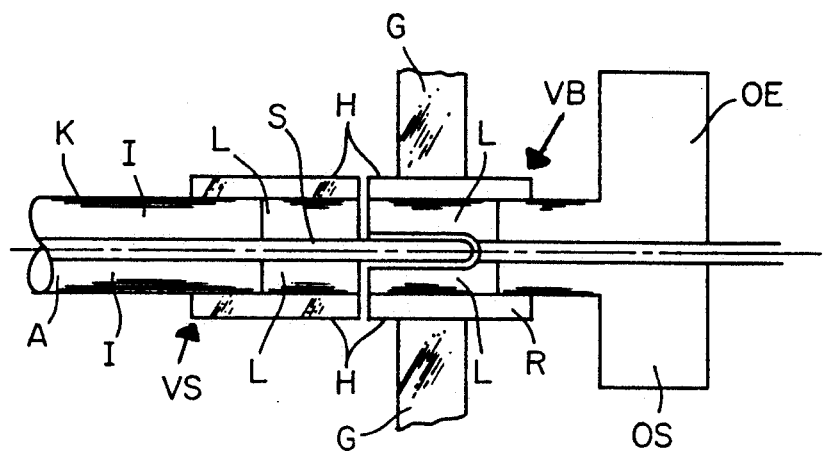
FIG. 3 illustrates a schematic view of an assembly of components of FIGS. 1 and 2.

Jack VB can, however, also be mounted as illustrated in FIG. 3 in the housing G of a piece of equipment. Cable K is connected to jack VB by a plug VS. On the equipment end an optical transmitter OS and or receiver OE can be connected to the optical coupling L of jack VB.

Figure 4:
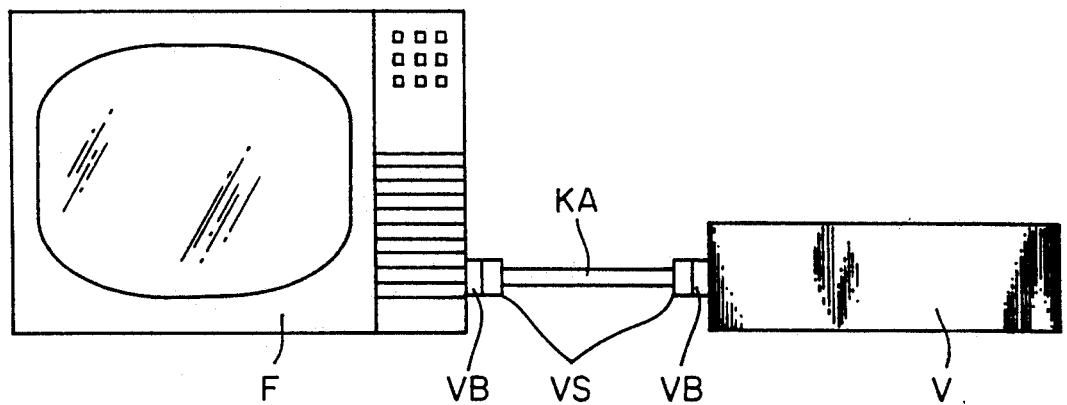
FIG. 4 illustrates an optical transmission system in accordance with the invention.

The information-transmission system illustrated in FIG. 4 represents one way of employing the cable in accordance with the invention.

A video recorder V is connected to a television set F by a coaxial cable K with a layer of insulation in the form of a dielectric that conducts light effectively. The ends of cable K are secured in a plug VS for example as illustrated in FIG. 2. Mounted on the components—video recorder V and television set F—are jacks VB that match plugs VS, which are also provided with an optical coupling facing the optical coupling L on plug VS. Connected to the end of the coupling in each plug VS opposite plug VS is an optical transmitter and/or receiver. The light from the optical transmitter in whatever component is transmitting travels through the optical coupling in the jack to the optical coupling on the plug, through the coaxial cable, and through the optical coupling on the plug and the optical coupling in the jack on the receiving component.

Both video recorder V and television set F can be provided with an optical transmitter, an infrared-emitting diode for example, and an optical receiver to allow the transmission of information in both directions.

Since the video signals are transmitted electrically and the control signals optically, they have no effect on each other and need not be separated in the video recorder or television set. Finally, there is no need for two different cables to transmit information, each with a plug at each end and a jack on each component.

The connector in accordance with the invention, however, is not limited to the application described herein. The connector in accordance with the invention can be employed to simultaneously transmit information of any type both electrically and optically between any two components—repeaters, terminals, data banks, etc. for example.

As already mentioned herein, the connector in accordance with the invention is appropriate for any cable with at least one core and at least one optically conductive layer of insulation—coaxial cable, power-transmission cable, ribbon cable, etc. for example.

We claim:

1. A connecting arrangement comprising a connector with a mating element that fits on the connector; a cable connectable to said connector and said mating element; said cable having at least one electrically conducting core; a light-transmitting electrical insulating layer surrounding said core; said connector and said mating element each having at least one electrical contact and one optical contact; said connector and said mating element being optically coupled for light transmission between said connector and said mating element at a location where said insulating layer lies against said connector, said connector and said mating element conducting both electrical and optical signals.

2. A connecting arrangement as defined in claim 1, including an optical coupling between said connector and said insulating layer, said connector being in contact with said insulating layer over a predetermined area, said insulating layer being transparent over said area for coupling optically said connector with said insulating layer in said optical coupling.

3. A connecting arrangement as defined in claim 1, including an optical coupling between said mating element and said insulating layer, said mating element being in contact with said insulating layer over a predetermined area, said insulating layer being transparent over said area for coupling optically said mating element with said insulating layer in said optical coupling.

4. A connecting arrangement as defined in claim 2, including optically conductive material in said connector over said area of contact between said connector and said insulating layer in said optical coupling.

5. A connecting arrangement as defined in claim 3, including optically conductive material in said mating element over said area of contact between said mating element and said insulating layer in said optical coupling.

6. A connecting arrangement as defined in claim 4, wherein said optical coupling is cylindrical.

7. A connecting arrangement as defined in claim 5, wherein said optical coupling is cylindrical.

8. A connecting arrangement as defined in claim 4, wherein said optical coupling has the same cross-section as said insulating layer.

9. A connecting arrangement as defined in claim 5, wherein said optical coupling has the same cross-section as said insulating layer.

10. A connecting arrangement as defined in claim 4, wherein said optical coupling has an end facing said cable with a cross-section smaller than the cross-section of said insulating layer.

11. A connecting arrangement as defined in claim 5, wherein said optical coupling has an end facing said cable with a cross-section smaller than the cross-section of said insulating layer.

12. A connecting arrangement as defined in claim 4, wherein said optical coupling has an end facing said cable with a cross-section larger than the cross-section of said insulating layer.

13. A connecting arrangement as defined in claim 5, wherein said optical coupling has an end facing said cable with a cross-section larger than the cross-section of said insulating layer.

14. A connecting arrangement as defined in claim 4, wherein said optical coupling has a lens-shaped surface facing said cable.

15. A connecting arrangement as defined in claim 5, wherein said optical coupling has a lens-shaped surface facing said cable.

16. A connecting arrangement as defined in claim 4, wherein an optical transmitter or receiver is connectable to said optical coupling.

17. A connecting arrangement as defined in claim 5, wherein an optical transmitter or receiver is connectable to said optical coupling.

18. A connecting arrangement as defined in claim 1, including a housing mounting selectively said connector and said mating element.

19. A connecting arrangement as defined in claim 18, wherein said mating element is connected to said connector on said housing, said cable having an optically conductive layer of insulation connected to said mating element.

20. A connecting arrangement as defined in claim 1, wherein said connector is a plug.

21. A connecting arrangement as defined in claim 1, wherein said mating element is a jack.

22. A connecting arrangement comprising a connector with a mating element that can fit on the connector; a cable connectable to said connector and said mating element; said cable having at least one electrically conducting core; a light-transmitting electrical insulating layer surrounding said core; said connector and said mating element each having at least one electrical contact and one optical contact; said connector and said mating element being optically coupled for light transmission between said connector and said mating element at a location where said insulating layer lies against said connector, said connector and said mating element conducting both electrical and optical signals; an optical coupling between said connector and said insulating layer, said connector being in contact with said insulating layer over a predetermined area, said insulating layer being transparent over said area for coupling optically said connector with said insulating layer in said optical coupling; optically conductive material in said connector over said area of contact between said connector and said insulating layer in said optical coupling; said optical coupling being cylindrical; said optical coupling having the same cross-section as said insulating layer; said optical coupling having a lens-shaped surface facing said cable; an optical transmitter or receiver being connectable to said optical coupling; a housing mounting selectively said connector and said mating element; said mating element being connected to said connector on said housing; said cable having an optically conductive layer of insulation connected to said mating element; said connector being a plug and said mating element being a jack.

* * * * *